(12) United States Patent
Hiratsuka et al.

(10) Patent No.: US 7,214,436 B2
(45) Date of Patent: May 8, 2007

(54) MAGNETIC RECORDING MEDIUM AND PROCESS FOR PRODUCING SAME

(75) Inventors: Ryoichi Hiratsuka, Miyagi (JP); Tomoe Ozaki, Miyagi (JP); Taketoshi Sato, Miyagi (JP); Miho Abiko, Miyagi (JP); Ichiro Kanagawa, Miyagi (JP); Kasumi Suzuki, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/439,196

(22) Filed: May 15, 2003

(65) Prior Publication Data

US 2003/0224216 A1    Dec. 4, 2003

(30) Foreign Application Priority Data

May 28, 2002 (JP) ............................ P2002-153837

(51) Int. Cl.
*G11B 5/66* (2006.01)

(52) U.S. Cl. .................................... 428/833.2

(58) Field of Classification Search .......... 428/694 TP, 428/694 TC, 900, 336, 833.1, 833.2; 427/128, 427/131; 204/192.2
See application file for complete search history.

(56) References Cited

U.S. PATENT DOCUMENTS

| 4,883,711 | A | * | 11/1989 | Shiroishi et al. | ............. 428/336 |
| 4,929,514 | A | * | 5/1990 | Natarajan et al. | ............ 428/611 |
| 5,624,725 | A | * | 4/1997 | Nelson et al. | ............. 428/65.5 |
| 6,576,322 | B2 | * | 6/2003 | Saito et al. | ................ 428/65.3 |

\* cited by examiner

*Primary Examiner*—Holly Rickman
(74) *Attorney, Agent, or Firm*—Robert J. Depke; Rockey, Depke, Lyons & Kitzinger LLC.

(57) ABSTRACT

A magnetic recording medium of a metal thin-film type, which includes a magnetic layer and a carbon protective layer on a non-magnetic support member, and in which a non-magnetic metal thin-film is provided between the magnetic layer and the carbon protective layer, is provided. The magnetic recording medium thus produced can be run stably.

1 Claim, 4 Drawing Sheets

MAGNETIC RECORDING MEDIUM AND PROCESS FOR PRODUCING SAME

CROSS REFERENCE TO RELATED APPLICATIONS

The present document claims priority to Japanese Priority Document JP 2002-153837, filed in the Japanese Patent Office on May 28, 2002, the entire contents of which are incorporated herein by reference to the extent permitted by law.

BACKGROUND OF THE INVENTION

1. Field of the Invention

The present invention relates to a magnetic recording medium having a magnetic layer of a metal thin-film type and a process for producing same.

2. Description of the Related Art

As magnetic recording media for high-density magnetic recording, so-called metal thin-film type magnetic recording media have been proposed. In these so-called metal thin-film type magnetic recording media, a metallic magnetic material, such as a Co—Ni alloy, a Co—Cr alloy, Co—O and the like, is deposited on a non-magnetic support member, such as a polyester film, a polyamide film, a polyimide film and the like, by a plating process or a vacuum thin-film forming technique, including a vacuum deposition (evaporation) process, a sputtering process, an ion plating process and the like.

Because such metal thin-film type magnetic recording media have a number of advantageous characteristics, they are mainstream in the field of high-density magnetic recording. One of the advantages the metal thin-film type magnetic recording media have is that, due to the fact that they have superior coercive force and squareness ratio, and that the thickness of the magnetic layer can be made extremely thin, they have superior electromagnetic conversion characteristics at short wavelengths and demagnetization during recording and thickness loss during reproduction are extremely small. In addition, because, unlike in metal particle (MP) magnetic recording media, a binder, which is a non-magnetic material, is not incorporated into the magnetic layer in the metal thin-film type magnetic recording media, the packing density of the ferromagnetic metal particles can be increased.

Further, so-called oblique-angle deposition type magnetic recording media have been put to practical use. In the oblique-angle deposition type magnetic recording media, a magnetic layer is formed by depositing a metallic magnetic material at an oblique angle in order to improve electromagnetic conversion characteristics and obtain larger output.

In order to reduce spacing loss in the metal thin-film type magnetic recording media to accommodate high-density recording, there is a trend towards smoother surfaces for the magnetic layer. However, as the surface of the magnetic layer becomes smoother, the contact area between the magnetic layer and a magnetic head becomes larger, thereby increasing the frictional force therebetween as well as the shear stress experienced by the magnetic layer. In order to protect the magnetic layer under such harsh conditions, it is important to form a protective layer on the magnetic layer.

For the protective layer that protects the magnetic layer, for example, a carbon film, a quartz ($SiO_2$) film, a zirconia ($ZrO_2$) film and the like can be used, and these films have already found practical applications in hard disks. As a material for the protective layer, of carbon films, particularly hard carbon films having a diamond structure (so-called diamond-like carbon films) are effective and are currently widely used in practical applications.

Examples of processes for depositing the hard carbon film mentioned above include a sputtering process and a plasma chemical vapor deposition (hereinafter referred to simply as plasma CVD) process.

In the sputtering process, a sputter gas, such as argon (Ar) gas, is ionized (plasmarized) and accelerated using an electric field or a magnetic field, and the resultant ions are bombarded on a target surface. Target atoms are sputtered from the target when the plasma particles hit the target, and these sputtered atoms are deposited on a base material to form a sputter film.

However, when a hard carbon film is deposited by the sputtering process, the deposition rate is generally slow and hence therein lies a problem in that the process, from a commercial standpoint, is poor in terms of productivity.

On the other hand, in the plasma CVD process, the energy of the plasma generated in the electric field causes a reactant gas, which becomes a material for the film to be formed, to under go a chemical reaction, such as decomposition or synthesis, and the product obtained from the chemical reaction is deposited on a base material to form a CVD film.

The plasma CVD process has an advantage in that the deposition rate is higher as compared to the sputtering process, and therefore it is viewed favorably as a promising process for forming hard carbon films.

SUMMARY OF THE INVENTION

In magnetic recording media used today, such as metal evaporated tapes for digital recording, a so-called partially oxidized metallic magnetic thin-film, which is deposited while oxygen gas is fed, is formed as a magnetic layer. Magnetic recording media having a configuration in which a hard carbon film is formed as a protective layer on the magnetic layer have a problem in that the protective layer peels off from the magnetic layer as the media is used repeatedly, and in that the characteristics thereof thereby deteriorate. Specifically, when the magnetic recording medium is run, degradation in image quality accompanying level down phenomenon in so-called shuttle mode or clogging during still mode occurs, leading to a problem where normal operations cannot be performed.

The peeling off of the protective layer from the magnetic layer, which is the cause of the problems above, results from the fact that a highly oxidized metal oxide layer is formed on the surface in forming a partially oxidized metallic magnetic thin-film as the magnetic layer, and that the metal oxide layer has poor affinity for the carbon protective layer.

As such, the present inventors have conducted extensive studies in view of the problems above to provide a magnetic recording medium which can be run in a stable manner.

A magnetic recording medium according to an embodiment of the present invention is a magnetic recording medium of a metal thin-film type which includes a magnetic layer and a carbon protective layer on a non-magnetic support member, in which a non-magnetic metal thin-film is provided between the magnetic layer and the carbon protective layer.

The process for producing a magnetic recording medium according to an embodiment of the present invention includes the steps of: forming a magnetic layer on a non-magnetic support member through a vacuum thin-film forming technique; forming a non-magnetic metal thin-film on the magnetic layer; and forming a carbon protective layer on the non-magnetic metal thin-film. The formation of the non-magnetic metal thin-film and of the carbon protective layer are performed successively in an environment closed off from external air.

The magnetic recording medium of the present invention is advantageous in that excellent adhesion between the magnetic layer and the protective layer is maintained, the protective layer is prevented from peeling off from the magnetic layer even when the magnetic recording medium is run repeatedly, degradation in image quality accompanying a level drop in shuttle mode as well as occurrences of clogging during still mode can be prevented effectively, and the magnetic recording medium can be run in a stable manner. According to the process of the present invention for producing a magnetic recording medium, magnetic recording media with the advantages described above can be obtained.

In an embodiment of the magnetic recording medium of the present invention, by keeping the thickness of the non-magnetic metal thin-film provided between the magnetic layer and the carbon protective layer at 2 nm and above, the thickness of the carbon protective layer at 3 nm and above, and the total thickness of the non-magnetic metal thin-film and the carbon protective layer between 5 nm and 15 nm, it is made possible to effectively prevent the degradation in image quality accompanying a level drop in shuttle mode as well as occurrences of clogging during still mode, while maintaining electromagnetic conversion characteristics that are sufficient for purposes of practical application.

In an embodiment of the process of the present invention for producing a magnetic recording medium, by forming the non-magnetic metal thin-film after the magnetic layer is formed, the adhesion of the carbon protective layer is improved. Thus the protective layer can be prevented from peeling off from the magnetic layer even when the magnetic recording medium is run repeatedly, degradation in image quality accompanying a level drop in shuttle mode as well as occurrences of clogging during still mode can be prevented effectively, and the magnetic recording medium can be run in a stable manner.

BRIEF DESCRIPTION OF THE DRAWINGS

The above and other aspects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereinbelow, a magnetic recording medium of the present invention will be described in detail with reference to specific examples. However, it is to be understood that the present invention is by no means limited to these examples.

Figure 1:
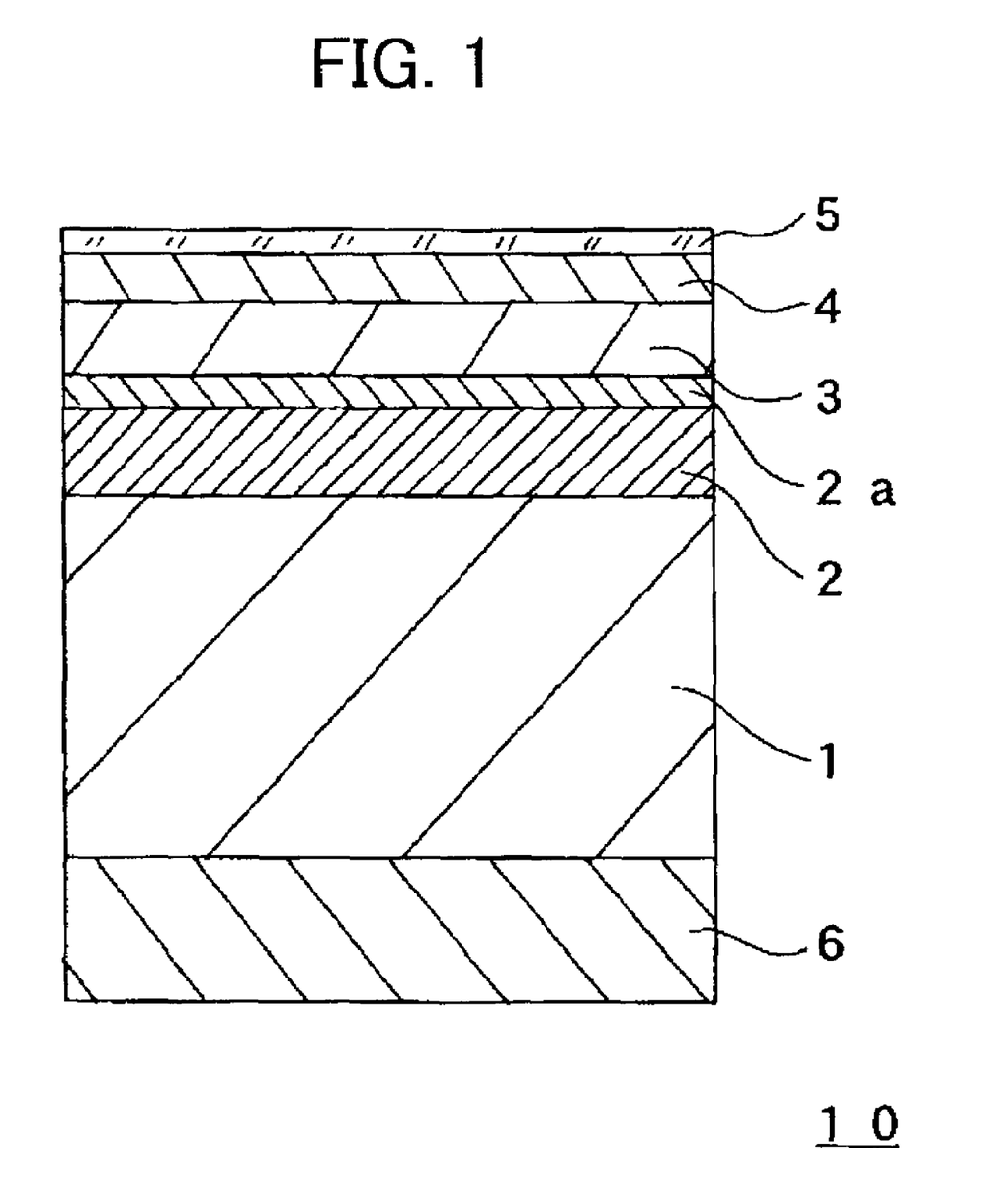
FIG. 1 is a schematic view showing the configuration of a magnetic recording medium of the present invention.

FIG. 1 is a schematic cross-sectional view of one example of a magnetic recording medium of the present invention.

A magnetic recording medium 10 has a configuration in which a magnetic layer 2, a non-magnetic metal thin-film 3, and a carbon protective layer 4 are formed sequentially on a non-magnetic support member 1.

In the magnetic recording medium 10 according to this example, there is provided a highly oxidized layer formed on a surface layer of the magnetic layer 2 in a magnetic layer deposition step described later. This highly oxidized layer is shown as a metal oxide layer 2a in FIG. 1.

In addition, a lubricant layer 5 is formed on the carbon protective layer 4, and a back coat layer 6 is formed on the surface of the non-magnetic support member 1 opposite the surface on which the magnetic layer 2 is formed.

Below, the layers forming the magnetic recording medium 10 will be described in detail.

Any conventionally known material generally used as a base material for magnetic tapes can be used for the non-magnetic support member 1. Examples of such a material include: polyesters, such as polyethylene terephthalate (PET) polyethylene naphthalate (PEN), and polyethylene 2,6-naphthalenedicarboxylate; polyolefins, such as polyethylene and polypropylene; cellulose derivatives, such as cellulose acetate; and plastics, such as polycarbonate, polyimide, polyamide, and polyamideimide.

A coating including a binder resin, a filler, and a surfactant can be applied to form a coating layer on the side of the non-magnetic support 1 on which the magnetic layer 2 is to be formed, thereby adding minute irregularities to the surface of the non-magnetic support member 1 and improving mechanical strength.

Examples of the binder resin include, for example, aqueous polyester resins, aqueous acrylic resins, aqueous polyurethane resins and the like.

Examples of the filler include, for example, heat-resistant polymer particles, silicon dioxide, calcium carbonate and the like.

The magnetic layer 2 is formed as a partially oxidized metallic magnetic film of a ferromagnetic metal material, and may be either a single-layer film or a multilayer film.

As the ferromagnetic metal material forming the magnetic layer 2, any conventionally known metal or alloy may be used, and examples include ferromagnetic metals, such as Co and Ni; materials, such as CoNi, FeCo, FeCoNi, CoCr, CoPt, CoPtB, CoCrPt, CoCrTa, and CoCrPtTa; as well as materials in which one or more other element(s) is/are contained in addition to the metals and alloys mentioned above.

In order to improve the corrosion resistance of the magnetic layer 2, adhesion, and the control of coercive force, a functional layer, such as an undercoat layer or an intermediate layer, may be formed between the non-magnetic support member 1 and the magnetic layer 2 or between the layers if the magnetic layer 2 is a multilayer film.

The magnetic layer 2 can be formed by so-called physical vapor deposition (PVD) techniques, such as a vacuum deposition (evaporation) process, in which a ferromagnetic material is heated and evaporated under vacuum conditions and then deposited on the non-magnetic support member 1, an ion plating process, in which a ferromagnetic metal material is evaporated during discharge, a sputtering process, in which atoms are sputtered from a target surface by argon ions that are generated by a glow discharge in an atmosphere mainly containing argon gas, and so forth.

Figure 2:
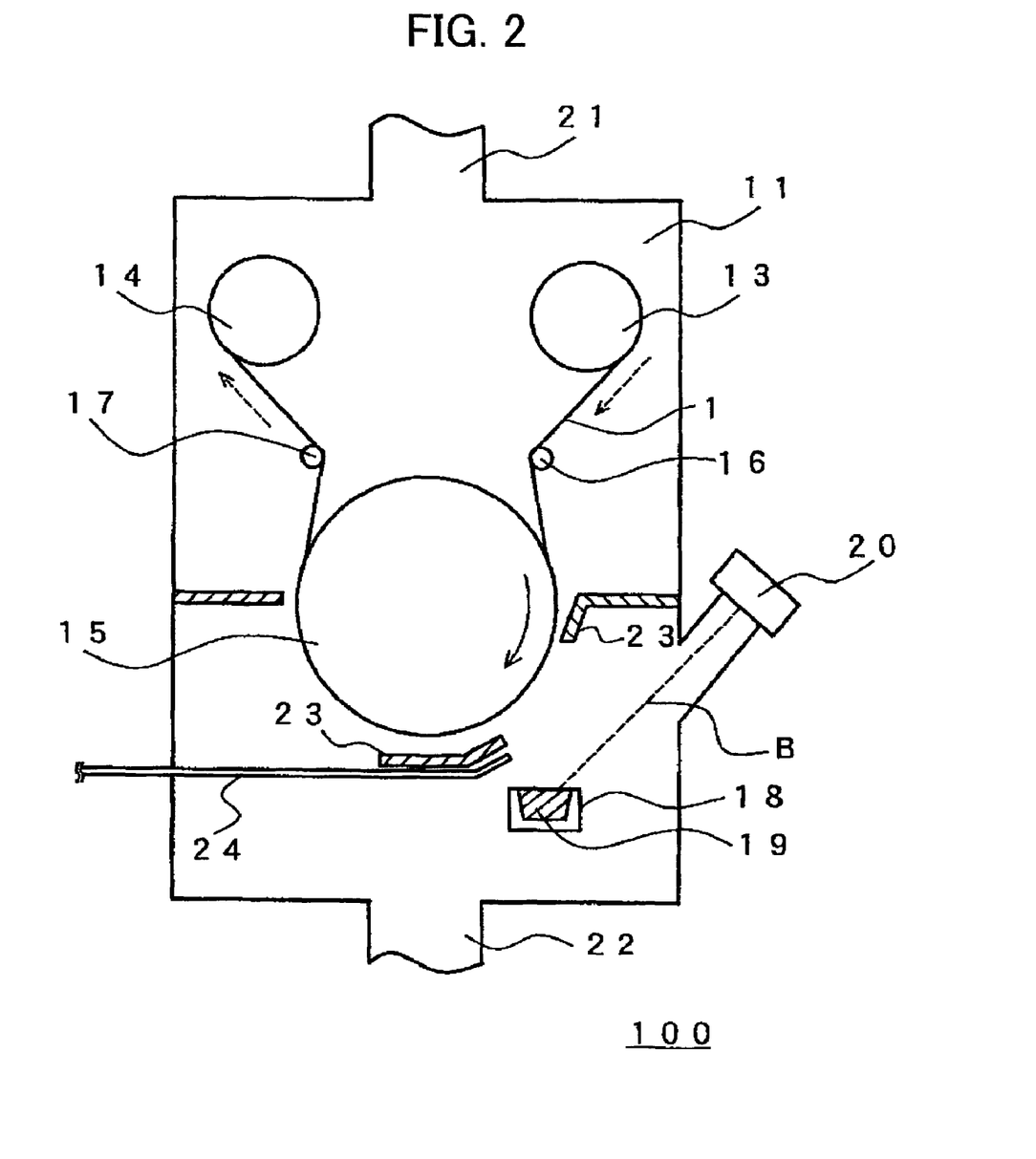
FIG. 2 is a schematic view showing the configuration of a vapor deposition apparatus for forming a magnetic layer.

FIG. 2 shows a schematic view of one example of a vapor deposition apparatus 100 for forming the magnetic layer 2.

In the vapor deposition apparatus 100, a supply roll 13 and a take-up roll 14 are provided in a vacuum chamber 11 which is exhausted by exhaust vents 21 and 22 to create vacuum conditions, and the non-magnetic support member 1 is run continuously between the supply roll 13 and the take-up roll 14.

A cooling can 15 is provided between the supply roll 13 and the take-up roll 14 along the path of the non-magnetic support member 1. The cooling can 15 is provided with a cooling apparatus (not shown) to suppress thermal deformation and the like, resulting from rises in temperature, of the non-magnetic support member 1 which runs around the circumference of the cooling can.

The non-magnetic support member 1 is continuously fed from the supply roll 13 to the take-up roll 14 via the circumference of the cooling can 15.

Guide rolls 16 and 17 provide a predetermined amount of tension to the non-magnetic support member 1 so that the non-magnetic support member 1 runs smoothly.

In the vacuum chamber 11, a crucible 18 is provided at a position lower than the cooling can 15, and the crucible 18 is filled with a film-forming material 19 including a metallic magnetic material.

On a sidewall portion of the vacuum chamber 11, there is provided an electron gun 20 for heating and evaporating the film-forming material 19 filled in the crucible 18. The electron gun 20 is disposed at a position such that the film-forming material 19 in the crucible 18 can be irradiated with an electron beam B emitted from the electron gun. The film-forming material 19 that evaporates due to the irradiation of the electron beam B is deposited on the surface of the non-magnetic support member 1 and the magnetic layer 2 is formed.

In addition, a shutter (or shutters) 23 is disposed between the cooling can 15 and the crucible 18 and closer to the cooling can 15 so as to shield a predetermined region of the non-magnetic support member 1 running around the circumference of the cooling can 15. By virtue of the shutter 23, the evaporated film-forming material 19 is deposited on the non-magnetic support member 1 at an oblique angle within a predetermined incident angle range.

Further, while the magnetic layer 2 is being deposited, oxygen gas is fed to the surface of the non-magnetic support member 1 by an oxygen gas feed pipe 24 which penetrates the sidewall portion of the vacuum chamber 11. Thus, the magnetic characteristics, durability and weather resistance of the magnetic layer 2 are improved.

As mentioned above, because oxygen gas is fed during the deposition of the magnetic layer 2, the metal oxide layer 2a, which is a highly oxidized layer, is formed as a surface layer of the magnetic layer 2.

In this example, the metal oxide layer 2a has an atomic ratio of oxygen to the constituent atoms (O/Co) of 0.5 and above, in other words, the metal oxide layer 2a has an oxygen atom content of 50% and above. Because the metal oxide layer 2a has poor affinity for the carbon protective layer 4 described below and hence is likely to cause the carbon protective layer 4 to peel off from the magnetic layer 2, in the present invention, durable adhesion of the carbon protective layer 4 is secured by providing a non-magnetic metal thin-film 3 between the magnetic layer 2 and the carbon protective layer 4.

The non-magnetic metal thin-film 3 may include various metal materials, such as, for example, Mo, W, Cu, and Zn or an alloy thereof, Au, Pt, and Ag or an alloy thereof, Group 4B elements Si, Ge, Sn, and Pb or an alloy thereof, Group 4A elements Ti and Zr or an alloy thereof and the like, and the non-magnetic metal thin-film 3 can be formed by, for example, a sputtering process.

Figure 3:
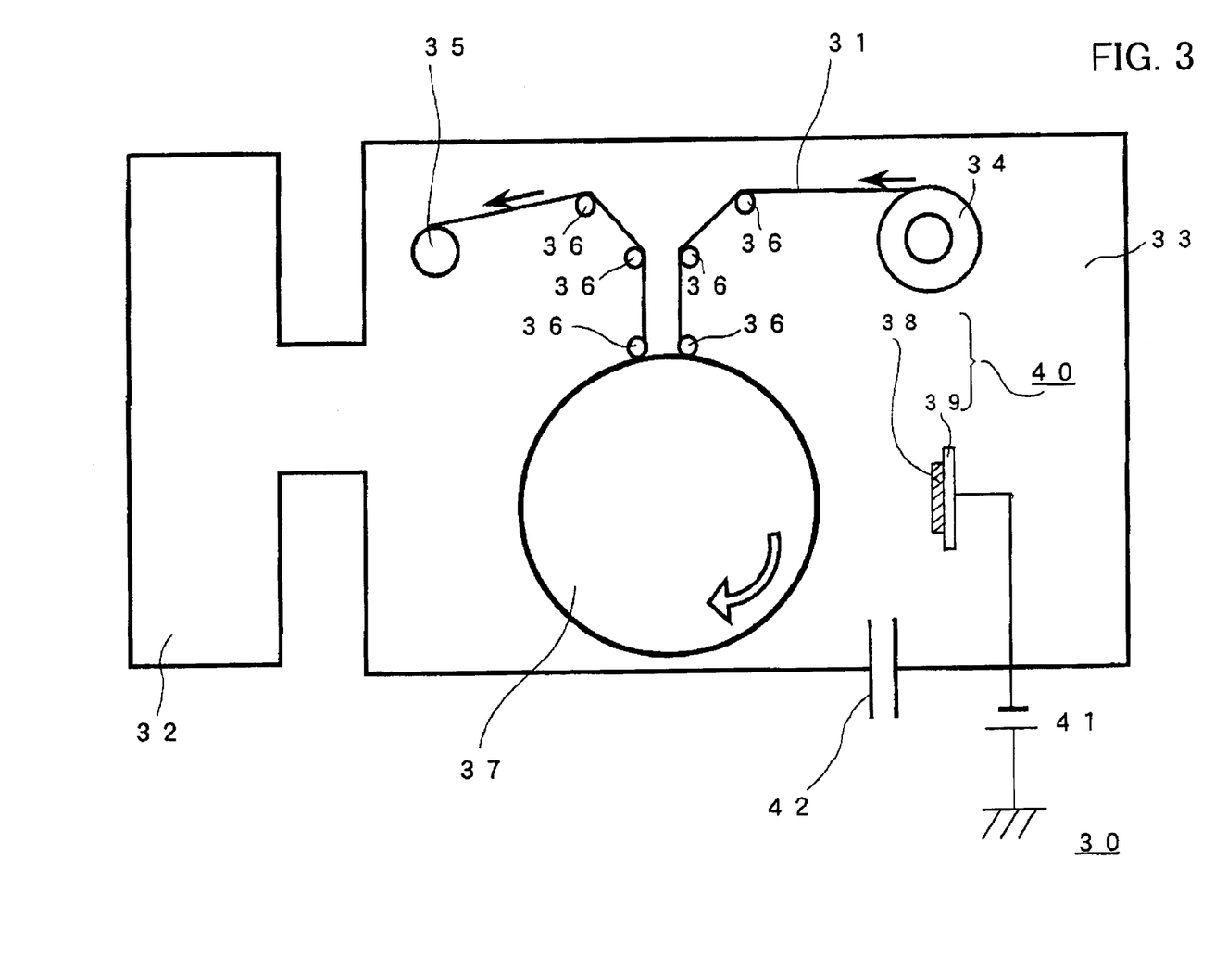
FIG. 3 is a schematic view showing the configuration of a sputtering apparatus for forming a non-magnetic metal thin-film.

FIG. 3 shows a schematic view of one example of a sputtering apparatus 30 for forming the non-magnetic metal thin-film 3.

In the sputtering apparatus 30, a base material 31, which is the non-magnetic support member 1 on which the magnetic layer 2 is already formed, is run continuously, and the non-magnetic metal thin-film 3 is formed continuously on the magnetic layer 2.

In the sputtering apparatus 30, a supply roll 34 and a take-up roll 35 are provided in a chamber 33 which is exhausted by a vacuum exhaust system 32 to create vacuum conditions, and the base material 31 in which the magnetic layer 2 is formed on the non-magnetic support member 1 is continuously run between the supply roll 34 and the take-up roll 35.

A cylindrical and rotatable opposite electrode can 37 is provided along the path of the base material 31 between the supply roll 34 and the take-up roll 35.

Guide rolls 36 are disposed between the supply roll 34 and the opposite electrode can 37 and between the opposite electrode can 37 and the take-up roll 35 so that a predetermined amount of tension is given to the base material 31 and so that the base material 31 runs smoothly.

In the chamber 33, a target 38 is disposed so as to face the opposite electrode can 37. The target 38 contains a material that is to form the non-magnetic metal thin-film 3. The target 38 is supported by a backing plate 39 that forms a cathode electrode, and the target 38 and the backing plate 39 together form a sputter cathode 40. The sputter cathode 40 is connected to a power source 41 for applying a direct current (DC) voltage having a negative potential.

In FIG. 3, an example is shown where only one sputter cathode 40 is provided, however the sputtering apparatus 30 is not limited thereto and a plurality of targets 38 may also be provided.

In this sputtering apparatus 30, in forming the non-magnetic metal thin-film 3, the chamber 33 is exhausted by the vacuum exhaust system 32 to reduce the pressure, and the exhaust speed is controlled by an exhaust valve (not shown). On the other hand, Ar gas is fed to the chamber 33 through a gas feed pipe 42 to adjust the pressure, and a voltage is applied with the opposite electrode can 37 as an anode and the backing plate 39 as a cathode to maintain a state in which a current is flowing.

The application of this voltage plasmarizes the Ar gas, and causes ionized Ar ions to bombard against the target 38 to sputter atoms therefrom.

Then, the atoms sputtered from the target 38 are deposited on the base material 31 running along the circumference of the opposite electrode can 37 to form the non-magnetic metal thin-film 3.

The base material 31 on which the non-magnetic metal thin-film 3 is thus formed is received by the take-up roll 35.

In order to secure good corrosion resistance and durability, the carbon protective layer 4 is formed on the non-magnetic metal thin-film 3.

The carbon protective layer 4 is a hard carbon film and is a carbon film having a diamond structure, in other words, a so-called diamond-like carbon film.

Carbon having a graphite structure as well as carbon having a diamond structure are known, and their structures can be analyzed by Raman spectroscopy. The term "diamond-like carbon film" as used in the present specification refers to a carbon film that has, at least in part, a diamond structure, and in which peaks characteristic of diamond structures is observed in a Raman spectrum. Generally, a Raman spectrum of a diamond-like carbon film would show both peaks characteristic of a graphite structure and peaks characteristic of a diamond structure.

Figure 4:
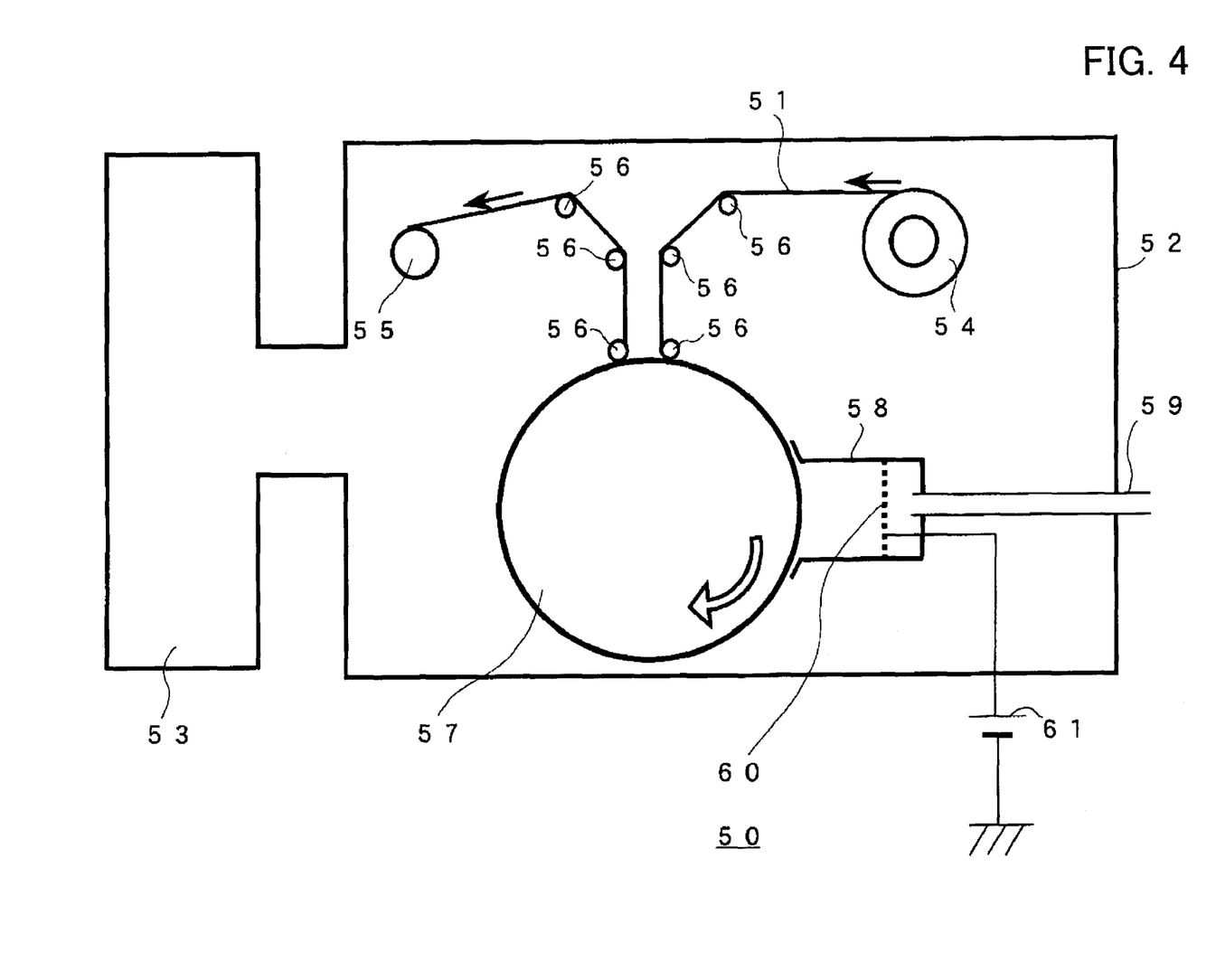
FIG. 4 is a schematic view of a plasma CVD continuous film formation apparatus for forming a carbon protective layer.

The carbon protective layer 4 can be formed by a CVD process using, for example, a plasma CVD continuous film formation apparatus 50 shown in FIG. 4.

A CVD process in which a carbon compound is decomposed in plasma and then deposited enables the deposition of a diamond-like carbon film in an extremely thin layer while giving the diamond-like carbon film superior wear resistance, corrosion resistance, surface coverage, a smooth surface configuration as well as high electrical resistivity.

As a reactant gas, a gas such as ethylene or propane, or a hydrocarbon gas obtained by gasifying a liquid such as toluene or xylene is used. These hydrocarbon gases may be used individually or in combination, and, during the generation of plasma, a non-hydrocarbon gas, such as Ar or $N_2$, may be fed to promote the decomposition of carbon compounds.

In the plasma CVD continuous film formation apparatus 50 shown in FIG. 4, a supply roll 54 and a take-up roll 55 are provided in a vacuum chamber 52 which is exhausted by means of an exhaust system 53 to create vacuum conditions, and a base material 51, in which the magnetic layer 2 and the non-magnetic metal thin-film are 3 formed on the non-magnetic support member 1, runs continuously between the supply roll 54 and the take-up roll 55.

A cylindrical and rotatable opposite electrode can 57 is provided along the path of the base material 51 and between the supply roll 54 and the take-up roll 55.

The base material 51 is continuously fed from the supply roll 54, and passes the circumference of the opposite electrode can 57 before it is received by the take-up roll 55. Guide rolls 56 are disposed between the supply roll 54 and the opposite electrode can 57 and between the opposite electrode can 57 and the take-up roll 55 so that the base material 51 is given a predetermined amount of tension and so that the base material 51 runs smoothly.

Further, a reactor 58 formed with, for example, Pyrex (registered trademark) glass or plastic is provided so as to face the opposite electrode can 57. A film-forming gas is fed to the reactor 58 from a gas inlet 59.

A plate-formed discharge electrode 60 is provided in the reactor 58. A voltage of, for example, 500 to 2,000 V is applied to the discharge electrode 60 by a DC power source 61 provided outside the vacuum chamber.

In the plasma CVD continuous film formation apparatus 50 having the construction described above, when a voltage is applied to the discharge electrode 60, plasma is generated between the discharge electrode 60 and the opposite electrode can 57. Then, the film-forming gas fed to the reactor 58 is decomposed or chemically bonded by the energy of the plasma generated and is then deposited on the base material 51.

It is desirable that the discharge electrode 60 have a high permeability for gas, that it be capable of applying an electric field uniformly, and further that it have flexibility. To this end, a mesh-formed electrode is suitable for use.

An example of a material that may be used for the discharge electrode 60 includes copper, but other electrically conductive metals such as stainless steel, brass, or gold can also be used.

As mentioned above, the magnetic recording medium 10 of the present invention can be produced by a process including the steps of: depositing the magnetic layer 2 on the non-magnetic support member 1 through a vacuum thin-film forming technique; depositing the non-magnetic metal thin-film 3 on the magnetic layer 2 ; and depositing the carbon protective layer 4 on the non-magnetic metal thin-film 3. In addition, in order to avoid the formation of an oxide layer on the top surface of the non-magnetic metal thin-film 3, it is desirable that the step of depositing the non-magnetic metal thin-film 3 and the step of depositing the carbon protective layer 4 be performed in closed environments shielded from external air, for example, in a single chamber or in an environment where the non-magnetic support member 1 is taken through successive steps through a path closed off from outside.

In the magnetic recording medium 10 of an embodiment of the present invention, if required, the back coat layer 6 may be formed on the side of the non-magnetic support member 1 opposite the surface on which the magnetic layer 2 is formed, or the lubricant layer 5 may be formed on the carbon protective layer 4. In such cases, conventionally known materials, such as a non-magnetic pigment and resin binders may be used, as deemed appropriate, for the back coat layer 6 and the lubricant layer 5.

EXAMPLES

Hereinbelow, the magnetic recording medium 10 of the present invention will be described in detail with reference to specific examples, however, it is to be understood that the magnetic recording medium 10 of the present invention is not limited to these examples. In preparing the magnetic recording medium 10 in the following examples, the step of depositing a non-magnetic metal thin-film 3 and the step of depositing a carbon protective layer 4 were performed successively in the same chamber.

Experimental Example 1

In this example, samples were prepared in which the thicknesses of the non-magnetic metal thin-film 3 as well as the thicknesses of the carbon protective layer 4 were different, and suitable values for the total thickness of the non-magnetic metal thin-film 3 and the carbon protective layer 4 were studied.

First, as the non-magnetic support member 1 of the magnetic recording medium 10 shown in FIG. 1, a polyethylene terephthalate (hereinafter referred to as simply as PET) film having a thickness of 6 μm was prepared, and a magnetic layer 2 was deposited on the non-magnetic support member 1 using the vapor deposition apparatus 100 shown in FIG. 2 under the following conditions.

(Deposition Conditions)

| Deposition material: | Co 100 wt % |
|---|---|
| Incident angle: | 45 to 90° |
| Gas fed: | Oxygen gas |
| Pressure when oxygen is fed: | $2.0 \times 10^{-2}$ Pa |
| Thickness of magnetic layer: | 200 nm |

After depositing the magnetic layer 2, it was confirmed that the surface oxide layer 2a having a thickness of about 10 nm was formed on the surface of the magnetic layer 2.

Then, the non-magnetic metal thin-film 3 was deposited under the conditions shown below using the sputtering apparatus 30 shown in FIG. 3.

In this step, samples in which the thickness of the non-magnetic metal thin-film 3 was 2 nm (example A1), 3 nm (example A2), 3 nm (example A3), 0 nm (comparative example A1), 3 nm (comparative example A2), and 1 nm (comparative example A3) were prepared.

(Sputtering Conditions)

| Sputter target: | Ti |
|---|---|
| Gas fed: | Ar |
| Degree of vacuum during sputtering: | 0.4 Pa |

Next, the carbon protective layer 4 was deposited under the conditions shown below using the plasma CVD continuous film formation apparatus 50 shown in FIG. 4.

In this step, with respect to the samples in examples A1 to A3 and comparative examples A1 to A3, the carbon protective layers 4 were deposited so that their respective thicknesses were 3 nm (example A1), 5 nm (example A2), 7 nm (example A3), 5 nm (comparative example A1), 2 nm (comparative example A2), and 4 nm (comparative example A3).

(CVD Conditions)

| Gas fed: | Ethylene/argon mixed gas (150 sccm) (Argon ratio: 20 vol %) |
|---|---|
| Reaction pressure: | 30 Pa |
| Power: | +1.2 kV |

Next, the lubricant layer 5 was deposited using a perfluoropolyether lubricant, and a carbon back coat layer 6 was formed, and the desired magnetic recording medium 10 was thus obtained.

Properties of the magnetic recording medium samples thus prepared in examples A1 to A3 and comparative examples A1 to A3 were evaluated.

The evaluation included a shuttle mode test, a still durability test, and a friction test, which were conducted in the method described below. In the shuttle mode test and the still durability test, a DVC camcorder DCR VX-700 (manufactured by Sony Corporation) was used.

(Shuttle Mode Test)

After recording once over a period of 10 minutes in an environment of 40° C. and 30% relative humidity, the samples were played back 99 times, and the output (dB) of the 100$^{th}$ reading was compared to the initial output.

(Still Durability Test)

The samples were held in a still state in an environment of −5° C., and the time taken (hours: H) for the output to decrease by 3 dB from the initial output was measured.

(Friction Test)

A rubbing friction test was conducted in an environment of 40° C. and 80% relative humidity and the friction coefficient was measured.

The results of the evaluation of the properties described above are shown in table 1 below.

TABLE 1

| | Thickness of non-magnetic metal thin-film | Thickness of protective layer | Results of shuttle mode test | Results of still durability test | Results of friction test |
|---|---|---|---|---|---|
| Exmpl. A1 | 2 nm | 3 nm | −2.5 dB | >5 H | 0.33 |
| Exmpl. A2 | 3 nm | 5 nm | −2.0 dB | >5 H | 0.33 |
| Exmpl. A3 | 3 nm | 7 nm | −1.8 dB | >5 H | 0.30 |
| Comp. Exmpl. A1 | 0 nm | 5 nm | −4.2 dB | 1.2 H | 0.42 |
| Comp. Exmpl. A2 | 3 nm | 2 nm | −4.5 dB | 0.5 H | 0.55 |
| Comp. Exmpl. A3 | 1 nm | 4 nm | −4.0 dB | 1.4 H | 0.38 |

As can be seen from table 1, the magnetic recording medium samples in examples A1 to A3 in which the thicknesses of the non-magnetic metal thin-film 3, the carbon protective layer 4 and the non-magnetic metal thin-film 3 and the carbon protective layer 4 in total were 2 nm and above, 3 nm and above and 5 nm and above, respectively, the results of the shuttle running test, the still durability test, and the friction test were favorable for purposes of practical application.

By contrast, for the samples in comparative examples A1 and A3, in which the thickness of the non-magnetic metal thin-film 3 was less than 2 nm, and for the sample in comparative example A2, in which the thickness of the carbon protective layer 4 was less than 3 nm, a decrease in output of 3 dB and above was confirmed in the shuttle traveling test which renders these samples unsuitable for practical use. In addition, with respect to these samples in the comparative examples, a drop in output was observed after a short period of time in the still durability test, and the friction coefficient was high under the harsh conditions adopted for the friction test, and these samples were thus again found to be unsuitable for practical use.

Further, when the total thickness of the non-magnetic metal thin-film 3 and the carbon protective layer 4 exceeds 15 nm, the electromagnetic conversion characteristics deteriorate, and therefore, it is desirable that the total thickness be kept at 15 nm or less.

Experimental Example 2

In this example, samples in which the non-magnetic metal thin-film 3 was formed using Mo, W, Cu, and Zn and a sample in which the non-magnetic metal thin-film 3 was not formed were prepared in order to study the effects of forming the non-magnetic metal thin-film 3.

First, as the non-magnetic support member 1 of the magnetic recording medium 10 shown in FIG. 1, a PET film having a thickness of 6 μm was prepared, and the magnetic layer 2 was deposited on the non-magnetic support member 1 using the vapor deposition apparatus 100 shown in FIG. 2 under the following conditions.

(Deposition Conditions)

| Deposition material: | Co 100 wt % |
|---|---|
| Incident angle: | 45 to 90° |
| Gas fed: | Oxygen gas |

-continued

| | |
|---|---|
| Pressure when oxygen is fed: | $2.0 \times 10^{-2}$ Pa |
| Thickness of magnetic layer: | 200 nm |

After the magnetic layer 2 was deposited, it was confirmed that the surface oxide layer 2a having a thickness of about 10 nm was formed on the surface of the magnetic layer 2.

Then, a non-magnetic metal thin-film 3 was deposited under the conditions shown below using the sputtering apparatus 30 shown in FIG. 3.

In this step, samples in which the non-magnetic metal thin-film 3 was formed with Mo (example B1), W (example B2) Cu (example B3), and Zn (example B4) were prepared, and a sample in which the non-magnetic metal thin-film 3 was not formed (comparative example B1) was prepared.

(Sputtering Conditions)

| | |
|---|---|
| Gas fed: | Ar |
| Degree of vacuum during sputtering: | 0.4 Pa |
| Thickness of non-magnetic metal thin-film: | 3 nm |

Next, the carbon protective layer 4 was deposited using the plasma CVD continuous film formation apparatus 50 shown in FIG. 4 under the following conditions.

(CVD Conditions)

| | |
|---|---|
| Gas fed: | Ethylene/argon mixed gas (150 sccm) (Argon ratio: 20 vol %) |
| Reaction pressure: | 30 Pa |
| Power: | +1.2 kV |
| Thickness of carbon protective layer: | 7 nm |

Next, the lubricant layer 5 was deposited using a perfluoropolyether lubricant, the carbon back coat layer 6 was formed, and the desired magnetic recording medium 10 was thus obtained.

Properties of the magnetic recording medium samples thus obtained in examples B1 to B4 and comparative example B1 were evaluated.

The evaluation included a shuttle mode test, a still durability test, and a friction test, which were conducted in the method described below. In the shuttle mode test and still durability test, a DVC camcorder DCRVX-700 (manufactured by Sony Corporation) was used.

(Shuttle Mode Test)

After recording once over a period of 10 minutes in an environment of 40° C. and 30% relative humidity, the samples were played back 99 times, and the output (dB) of the $100^{th}$ reading was compared to the initial output.

(Still Durability Test)

The samples were held in a still state in an environment of −5° C., and the time taken (hours: H) for the output to decrease by 3 dB from the initial output was measured.

(Friction Test)

A sliding friction test was conducted in an environment of 40° C. and 80% relative humidity and the friction coefficient was measured.

The results of the evaluation of the properties described above are shown in table 2 below.

TABLE 2

| | Non-magnetic metal thin-film | Results of shuttle mode test | Results of still durability test | Results of friction test |
|---|---|---|---|---|
| Exmpl. B1 | Mo | −1.4 dB | >5 H | 0.32 |
| Exmpl. B2 | W | −1.1 dB | >5 H | 0.32 |
| Exmpl. B3 | Cu | −2.3 dB | >5 H | 0.34 |
| Exmpl. B4 | Zn | −1.5 dB | >5 H | 0.32 |
| Comp. Exmpl. B1 | None | −3.2 dB | 1.2 H | 0.42 |

As can be seen from table 2, for the magnetic recording medium samples in examples B1 to B4 in which the non-magnetic metal thin-film 3 was formed on the magnetic layer 2 using Mo, W, Cu, and Zn, the results for the shuttle mode test, the still durability test, and the friction test were all favorable for purposes of practical application.

Further, by forming the non-magnetic metal thin-film 3 with a thickness of 2 nm and above and the carbon protective layer 4 with a thickness of 3 nm and above, good results were obtained reliably in each of the shuttle mode test, the still durability test, and the friction test.

By contrast, for the magnetic recording medium sample in comparative example B1, in which the non-magnetic metal thin-film 3 was not formed, a drop of 3 dB and above was confirmed in the running test, and it was thus found that the sample was unsuitable for practical use. In addition, a drop in the output was confirmed after a short time in the still durability test and the friction coefficient was high under the harsh conditions adopted for the friction test, and this sample was thus again found to be unsuitable for practical use.

Experimental Example 3

In this example, samples in which the non-magnetic metal thin-film 3 was formed with Ag, Au, and Pt and a sample in which the non-magnetic metal thin-film 3 was not formed were prepared, in order to study the effects of forming the non-magnetic metal thin-film 3.

First, as the non-magnetic support member 1 of the magnetic recording medium 10 shown in FIG. 1, a PET film having a thickness of 6 μm was prepared, and the magnetic layer 2 was deposited on the non-magnetic support member 1 using the vapor deposition apparatus 100 shown in FIG. 2 under the following conditions.

(Deposition Conditions)

| | |
|---|---|
| Deposition material: | Co 100 wt % |
| Incident angle: | 45 to 90° |
| Gas fed: | Oxygen gas |
| Pressure when oxygen is fed: | $2.0 \times 10^{-2}$ Pa |
| Thickness of magnetic layer: | 200 nm |

After the magnetic layer 2 was deposited, it was confirmed that the surface oxide layer 2a having a thickness of about 10 nm was formed on the surface of the magnetic layer 2.

Then, the non-magnetic metal thin-film 3 was deposited under the conditions shown below using the sputtering apparatus 30 shown in FIG. 3.

In this step, samples in which the non-magnetic metal thin-film 3 was formed with Ag (example C1), Au (example C2), and Pt (example C3), and a sample in which the non-magnetic metal thin-film 3 was not formed (comparative example C1) were prepared.

(Sputtering Conditions)

| Gas fed: | Ar |
| --- | --- |
| Degree of vacuum during sputtering: | 0.4 Pa |
| Thickness of non-magnetic metal thin-film: | 3 nm |

Next, the carbon protective layer 4 was deposited using the plasma CVD continuous film formation apparatus 50 shown in FIG. 4 under the following conditions.

(CVD Conditions)

| Gas fed: | Ethylene/argon mixed gas (150 sccm) (Argon ratio: 20 vol %) |
| --- | --- |
| Reaction pressure: | 30 Pa |
| Power: | +1.2 kV |
| Thickness of carbon protective layer: | 7 nm |

Next, the lubricant layer 5 was deposited using a perfluoropolyether lubricant, the carbon back coat layer 6 was formed, and the desired magnetic recording medium 10 was thus obtained.

Properties of the magnetic recording medium samples thus obtained in examples C1 to C3 and comparative example C1 were evaluated.

The evaluation included a shuttle mode test, a still durability test, and a friction test, which were conducted in the method described below. In the shuttle mode test and the still durability test, a DVC camcorder DCR VX-700 (manufactured by Sony Corporation) was used.

(Shuttle Mode Test)

After recording once over a period of 10 minutes in an environment of 40° C. and 30% relative humidity, the samples were played back 99 times, and the output (dB) of the $100^{th}$ reading was compared to the initial output.

(Still Durability Test)

The samples were held in a still state in an environment of −5° C., and the time taken (hours: H) for the output to decrease by 3 dB from the initial output was measured.

(Friction Test)

A sliding friction test was conducted in an environment of 40° C. and 80% relative humidity and the friction coefficient was measured.

The results of the evaluation of the properties described above are shown in table 3 below.

TABLE 3

| | Non-magnetic metal thin-film | Results of shuttle mode test | Results of still durability test | Results of friction test |
| --- | --- | --- | --- | --- |
| Exmpl. C1 | Ag | −1.5 dB | >5 H | 0.30 |
| Exmpl. C2 | Au | −1.2 dB | >5 H | 0.29 |
| Exmpl. C3 | Pt | −0.8 dB | >5 H | 0.30 |
| Comp. Exmpl. C1 | None | −3.2 dB | 1.2 H | 0.42 |

As can be seen from table 3, for each of the magnetic recording medium samples in examples C1 to C3 in which the non-magnetic metal thin-film 3 was formed on the magnetic layer 2 using Ag, Au, and Pt, respectively, the results for the shuttle mode test, the still durability test, and the friction test were all favorable for purposes of practical application.

Further, by forming the non-magnetic metal thin-film 3 with a thickness of 2 nm and above and the carbon protective layer 4 with a thickness of 3 nm and above, good results were obtained reliably in each of the shuttle mode test, the still durability test, and the friction test.

By contrast, for the magnetic recording medium sample in comparative example C1, in which the non-magnetic metal thin-film 3 was not formed, a drop of 3 dB and above was confirmed in the shuttle mode test, and it was thus found that the sample was unsuitable for practical use. In addition, a drop in the output was confirmed after a short time in the still durability test and the friction coefficient was high under the harsh conditions adopted for the friction test, and this sample was thus again found to be unsuitable for practical use.

Experimental Example 4

In this example, samples in which the non-magnetic metal thin-film 3 was formed with Si, Ge, Sn, and Pb and a sample in which the non-magnetic metal thin-film 3 was not formed were prepared in order to study the effects of forming the non-magnetic metal thin-film 3.

First, as the non-magnetic support member 1 of the magnetic recording medium 10 shown in FIG. 1, a PET film having a thickness of 6 μm was prepared, and the magnetic layer 2 was deposited on the non-magnetic support member 1 using the vapor deposition apparatus 100 shown in FIG. 2 under the following conditions.

(Deposition Conditions)

| Deposition material: | Co 100 wt % |
| --- | --- |
| Incident angle: | 45 to 90° |
| Gas fed: | Oxygen gas |
| Pressure when oxygen is fed: | $2.0 \times 10^{-2}$ Pa |
| Thickness of magnetic layer: | 200 nm |

After depositing the magnetic layer 2, it was confirmed that the surface oxide layer 2a having a thickness of about 10 nm was formed on the surface of the magnetic layer 2.

Then, the non-magnetic metal thin-film 3 was deposited under the conditions shown below using the sputtering apparatus 30 shown in FIG. 3.

In this step, samples in which the non-magnetic metal thin-film 3 was formed with Si (example D1), Ge (example D2) Sn (example D3), and Pb (example D4), and a sample in which the non-magnetic metal thin-film 3 was not formed (comparative example D1) were prepared.

(Sputtering Conditions)

| Gas fed: | Ar |
| --- | --- |
| Degree of vacuum during sputtering: | 0.4 Pa |
| Thickness of non-magnetic metal thin-film: | 3 nm |

Next, the carbon protective layer 4 was deposited using the plasma CVD continuous film formation apparatus 50 shown in FIG. 4 under the following conditions.

(CVD Conditions)

| | |
|---|---|
| Gas fed: | Ethylene/argon mixed gas (150 sccm) (Argon ratio: 20 vol %) |
| Reaction pressure: | 30 Pa |
| Power: | +1.2 kV |
| Thickness of carbon protective layer: | 7 nm |

Next, the lubricant layer 5 was deposited using a perfluoropolyether lubricant, the carbon back coat layer 6 was formed, and the desired magnetic recording medium 10 was thus obtained.

Properties of the magnetic recording medium samples thus prepared in examples D1 to D4 and comparative example D1 were evaluated.

The evaluation included a shuttle mode test, a still durability test, and a friction test, which were conducted in the method described below. In the shuttle mode test and the still durability test, a DVC camcorder DCR VX-700 (manufactured by Sony Corporation) was used.

(Shuttle Mode Test)

After recording once over a period of 10 minutes in an environment of 40° C. and 30% relative humidity, the samples were played back 99 times, and the output (dB) of the 100 the reading was compared to the initial output.

(Still Durability Test)

The samples were held in a still state in an environment of −5° C., and the time taken (hours: H) for the output to decrease by 3 dB from the initial output was measured.

(Friction Test)

A sliding friction test was conducted in an environment of 40° C. and 80% relative humidity and the friction coefficient was measured.

The results of the evaluation of the properties are shown in table 4 below.

TABLE 4

| | Non-magnetic metal thin-film | Results of shuttle mode test | Results of still durability test | Results of friction test |
|---|---|---|---|---|
| Exmpl. D1 | Si | −1.2 dB | >5 H | 0.32 |
| Exmpl. D2 | Ge | −1.9 dB | >5 H | 0.33 |
| Exmpl. D3 | Sn | −2.2 dB | >5 H | 0.31 |
| Exmpl. D4 | Pb | −1.6 dB | >5 H | 0.32 |
| Comp. Exmpl. D1 | None | −3.2 dB | 1.2 H | 0.42 |

As can be seen from table 4, in each of the magnetic recording medium samples in examples D1 to D4 in which the non-magnetic metal thin-film 3 was formed on the magnetic layer 2 using Si, Ge, Sn, and Pb, respectively, the results for the shuttle traveling test, the still durability test, and the friction test were all favorable for purposes of practical application.

Further, by forming the non-magnetic metal thin-film 3 with a thickness of 2 nm and above and the carbon protective layer 4 with a thickness of 3 nm and above, good results were obtained reliably in each of the shuttle mode test, the still durability test, and the friction test.

By contrast, for the magnetic recording medium sample in comparative example D1, in which the non-magnetic metal thin-film 3 was not formed, a drop of 3dB and above was confirmed in the shuttle mode test, and it was thus found that the sample was unsuitable for practical use. In addition, a drop in the output was confirmed after a short time in the still durability test and the friction coefficient was high under the harsh conditions adopted for the friction test, and this sample was thus again found to be unsuitable for practical use.

Experimental Example 5

In this example, samples in which the non-magnetic metal thin-film 3 was formed with Ti and Zr and a sample in which the non-magnetic metal thin-film 3 was not formed were prepared in order to study the effects of forming the non-magnetic metal thin-film 3.

First, as the non-magnetic support member 1 of the magnetic recording medium 10 shown in FIG. 1, a PET film having a thickness of 6 μm was prepared, and the magnetic layer 2 was deposited on the non-magnetic support member 1 using the vapor deposition apparatus 100 shown in FIG. 2 under the following conditions.

(Deposition Conditions)

| | |
|---|---|
| Deposition material: | Co 100 wt % |
| Incident angle: | 45 to 90° |
| Gas fed: | Oxygen gas |
| Pressure when oxygen is fed: | $2.0 \times 10^{-2}$ Pa |
| Thickness of magnetic layer: | 200 nm |

After depositing the magnetic layer 2, it was confirmed that the surface oxide layer 2a having a thickness of about 10 nm was formed on the surface of the magnetic layer 2.

Then, the non-magnetic metal thin-film 3 was deposited under the conditions shown below using the sputtering apparatus 30 shown in FIG. 3.

In this step, samples in which the non-magnetic metal thin-film 3 was formed with Ti (example E1) and Zr (example E2), and a sample in which the non-magnetic metal thin-film 3 was not formed (comparative example E1) were prepared.

(Sputtering Conditions)

| | |
|---|---|
| Gas fed: | Ar |
| Degree of vacuum during sputtering: | 0.4 Pa |
| Thickness of non-magnetic metal thin-film: | 3 nm |

Next, the carbon protective layer 4 was deposited using the plasma CVD continuous film formation apparatus 50 shown in FIG. 4 under the following conditions.

(CVD Conditions)

| | |
|---|---|
| Gas fed: | Ethylene/argon mixed gas (150 sccm) (Argon ratio: 20 vol %) |
| Reaction pressure: | 30 Pa |
| Power: | +1.2 kV |
| Thickness of carbon protective layer: | 7 nm |

Next, the lubricant layer 5 was deposited using a perfluoropolyether lubricant, the carbon back coat layer 6 was formed, and the desired magnetic recording medium 10 was thus obtained.

Properties of the magnetic recording medium samples thus prepared in examples E1 and E2 and comparative example E1 were evaluated.

The evaluation included a shuttle mode test, a still durability test, and a friction test, which were conducted in the method described below. In the shuttle traveling test and still durability test, a DVC camcorder DCR VX-700 (manufactured by Sony Corporation) was used.

(Shuttle Mode Test)

After recording once over a period of 10 minutes in an environment of 40° C. and 30% relative humidity, the samples were played back 99 times, and the output (dB) of the $100^{th}$ reading was compared to the initial output.

(Still Durability Test)

The samples were held in a still state in an environment of −5° C., and the time taken (hours: H) for the output to decrease by 3 dB from the initial output was measured.

(Friction Test)

A running friction test was conducted in an environment of 40° C. and 80% relative humidity and the friction coefficient was measured.

The results of the evaluation of the properties are shown in table 5 below.

TABLE 5

|  | Non-magnetic metal thin-film | Results of shuttle mode test | Results of still durability test | Results of friction test |
| --- | --- | --- | --- | --- |
| Exmpl. E1 | Ti | −1.8 dB | >5 H | 0.30 |
| Exmpl. E2 | Zr | −2.0 dB | >5 H | 0.33 |
| Comp. Exmpl. E1 | None | −3.2 dB | 1.2 H | 0.42 |

As can be seen from Table 5, in each of the magnetic recording medium samples in examples E1 and E2 in which the non-magnetic metal thin-film 3 was formed on the magnetic layer 2 using Ti and Zr, respectively, the results for the shuttle mode test, the still durability test, and the friction test were all favorable for purposes of practical application.

Further, by forming the non-magnetic metal thin-film 3 with a thickness of 2 nm and above and the carbon protective layer 4 with a thickness of 3 nm and above, good results were obtained reliably in each of the shuttle mode test, the still durability test, and the friction test.

By contrast, for the magnetic recording medium sample in comparative example E1, in which the non-magnetic metal thin-film 3 was not formed, a drop of 3 dB and above was confirmed in the shuttle mode test, and it was thus found that the sample was unsuitable for practical use. In addition, a drop in the output was confirmed after a short time in the still durability test and the friction coefficient was high under the harsh conditions adopted for the friction test, and this sample was thus again found to be unsuitable for practical use.

It is understood that the invention is not limited to the specific examples and embodiments, including those shown in the drawings, which are intended to assist a person skilled in the art in practicing the invention. Many modifications and improvements may be made without departing from the scope of the invention, which should be determined based on the claims below, including any equivalents thereof.

What is claimed is:

1. A single-sided magnetic recording medium comprising a magnetic layer and a carbon protective layer formed as layers above one side of a non-magnetic support member, wherein a non-magnetic metal thin-film is provided between said magnetic layer and said carbon protective layer, and wherein said non-magnetic metal thin-firm is selected from the group consisting of W, Cu, and Zn.

* * * * *